(12) United States Patent
Nakayama et al.

(10) Patent No.: US 8,122,565 B2
(45) Date of Patent: Feb. 28, 2012

(54) HAND-HELD POWERED SUCTION DEVICE

(75) Inventors: Yoshiki Nakayama, Akishima (JP); Masaki Takeda, Ohme (JP); Junichi Akaike, Chofu (JP)

(73) Assignee: Yamabiko Corp., Tokyo (JP)

( * ) Notice: Subject to any disclaimer, the term of this patent is extended or adjusted under 35 U.S.C. 154(b) by 434 days.

(21) Appl. No.: 12/216,594

(22) Filed: Jul. 8, 2008

(65) Prior Publication Data
US 2009/0113661 A1 May 7, 2009

(30) Foreign Application Priority Data
Nov. 1, 2007 (JP) .................................. 2007-285111

(51) Int. Cl.
*A47L 5/24* (2006.01)
(52) U.S. Cl. ................ 15/344; 15/330; 15/337; 15/339; 15/405; 15/412
(58) Field of Classification Search .................... 15/344, 15/412, 330, 337, 339, 405; 415/121.1, 121.2
See application file for complete search history.

(56) References Cited

U.S. PATENT DOCUMENTS

| | | | | |
|---|---|---|---|---|
| 4,325,163 A | * | 4/1982 | Mattson et al. ................. | 15/330 |
| 5,245,726 A | * | 9/1993 | Rote et al. ........................ | 15/339 |
| 5,794,864 A | * | 8/1998 | Hammett et al. ................ | 241/56 |

FOREIGN PATENT DOCUMENTS
JP 2000-179497 6/2000

OTHER PUBLICATIONS
English Abstract of JP 2000-179497.

* cited by examiner

*Primary Examiner* — Robert Scruggs
(74) *Attorney, Agent, or Firm* — Dykema Gossett PLLC

(57) ABSTRACT

To obtain a hand-held powered suction device, which secures a high suction performance by a lightweight fan while preventing a blade of the fan from being damaged or being broken due to a sucked object. Forming an air intake opening along a driving axis of a fan in a portable-type fan case and providing a fan protection member to be rotated at an upstream side in an air intake direction of the fan within the intake opening being attached so as to be integrally rotated with the driving axis, a shock absorbing surface that is perpendicular in an air intake direction of the intake opening is formed on the fan protection member.

9 Claims, 6 Drawing Sheets

HAND-HELD POWERED SUCTION DEVICE

BACKGROUND OF THE INVENTION

1. Field of the Invention

The present invention relates to a hand-held suction device, which is driven by a power.

2. Description of the Related Art

A hand-held suction device to be driven by a power has been known, which draws a garden debris such as a falling leaf and a dust by using a suction pressure of a centrifugal blower to collect the debris into a bag or the like that is attached to a blowing tip. FIG. 1 is an explanatory view showing an example of a conventional hand-held powered suction device (refer to the Japanese Patent Application Laid-Open No. 2000-179497; FIG. 1A is an external view and FIG. 1B is a front view of a fan case).

In this conventional example, a main body 1 is integrally formed by a motor 11 for driving a fan 10, a recoil starter 12 for starting, a fuel tank 13, and a fan case 14 or the like. A suction pipe 2 is detachably coupled with an air intake opening 14A of a fan case 14 and a blowing pipe 3 is detachably coupled with an air blowing opening 14B of the fan case 14. Then, dust bag having suitable ventilation property is attached to a blowing end of the blowing pipe 3. The example shown in the drawing is a hand-held apparatus and handles 15 and 16 griped by an operator are mounted on the main body 1. In addition, in the air intake opening 14A of the fan case 14, a cutter 5 is provided, which is placed on a driving axis of the fan 10 to be rotated with the fan 10.

According to such a hand-held powered suction device, the fan 10 is driven due to start of the motor 11, and a garden debris such as fallen leaves, a wood chip, and a dust is drawn into the air intake opening 14A of the fan case 14 via the suction pipe 2 due to a suction pressure caused by blowing from the fan 10. Therefore, the debris is crushed by the cutter 5 to be rotated with the fan 10 and the crushed debris object is transferred to the air blowing opening 14B passing through an air intake passage in the fan case 14 to be collected in the dust bag 4 via the blowing pipe 3.

SUMMARY OF THE INVENTION

In the conventional hand-held powered suction device, the debris drawn into the air intake opening 14A from the front end of the suction pipe 2 is crushed by the cutter 5, however, all of the debris does not pass between blades of the fan 10 after all of the debris is provided with a crushing action due to the cutter 5 and the debris may reach the fan 10 directly, avoiding a blade of the cutter 5. Particularly when the device sucks an elongated and hard branch or wood chip or the like, the front ends of the branch and the wood chip or the like may crush into the fan 10 directly before receiving the crushing action of the cutter 5 and when they hardly crushes into the fan 10, it is afraid that the blades of the fan 10 may be damaged or be broken.

On the contrary, in order to prevent damage and breakage of the fan 10, the intensity of the blade of the fan 10 may be increased, however, according to the hand-held powered suction device, in order to improve an operability, it is necessary to decrease a weight, so that the weight of the fan 10 should be reduced and this makes it impossible to give a sufficient intensity to the fan 10 itself. In addition, trying to obtain a desired suction power with a high efficiency at a low torque obtained from a small motor 11, it is necessary to thicken the blades of the fan 10 that is made lighter so as to improve a suction property due to the fan 10. However, if this is realized, a disadvantage such that a damage ratio of the blade when the blade crushes into the debris is made higher is caused for the amount that the blades of the fan 10 are thickened.

In addition, in the case of sucking the grass and a cord or the like that are soft and long, if the cutter 5 is provided in the air intake opening 14A like the conventional art, the long grass and cord or the like stick to the cutter 5 and a large load is given to the motor 11, so that it may be afraid that a disadvantage such that the output of the motor 11 is lowered or stopped. In addition, when there is no cutter 5, a disadvantage such that the long grass and cord or the like directly stick to the fan 10 may be caused.

In the present invention, to cope with the above-mentioned disadvantages will be described as an example of a problem. In other words, the objects of the present invention are to enable to secure a high suction performance by a lightweight fan while preventing damage or breakage of a blade of a fan due to a sucked object and to enable to have an effective crushing processing for the sucked object without sticking of a long grass and a long cord or the like in a hand-held powered suction device.

In order to attain such an object, the hand-held suction device according to the present invention is provided with at least following characteristics.

The hand-held suction device, which forms an air intake opening in a portable-type fan case along a driving axis of a fan and form an air blowing opening along a centrifugal direction of the fan for sucking a sucked object from a front end of a suction pipe that is attached to the air intake opening, is characterized in that a fan protection member is arranged within the air intake opening, which is rotated at the upstream side in an air intake direction of the fan being attached so as to be integrally rotated with the driving axis, and the fan protection member has a shock absorbing surface that is perpendicular in an air intake direction of the air intake opening.

According to such a characteristic, the protection member is provided, which is rotated at the upstream side in an air intake direction of the fan being attached so as to be integrally rotated with the driving axis, so that it is possible to secure a high suction performance by a lightweight fan while preventing damage or breakage of a wind of the fan due to the sucked object. In addition, the fan protection member has a shock absorbing surface that is perpendicular in an air intake direction of the air intake opening, so that it is possible to effectively crash the sucked object that crashes into the shock absorbing surface by shock energy upon sucking of the object. In addition, the fan protection member having the shock absorbing surface blocks the long grass and the long cord from directly directed toward the fan, so that it is possible to avoid a disadvantages such that the long grass and the long cord or the like stick to the fan.

DESCRIPTION OF THE PREFERRED EMBODIMENTS

Figure 1A:
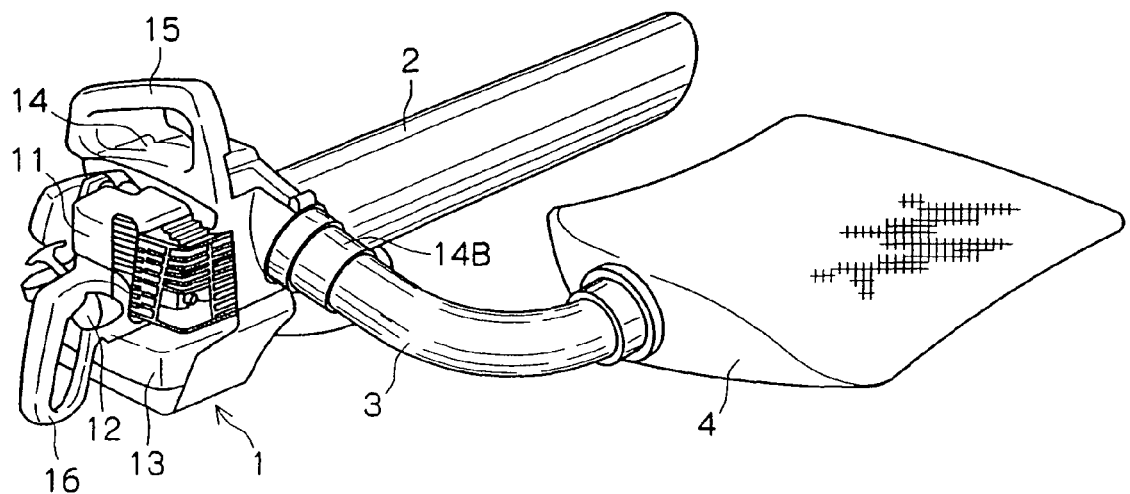
FIGS. 1A and 1B are explanatory views showing basic structures of a conventional art and an embodiment of the present invention, FIG. 1A beinq an external view and FIG. 1B being a front view of a fan case.
Figure 1B:
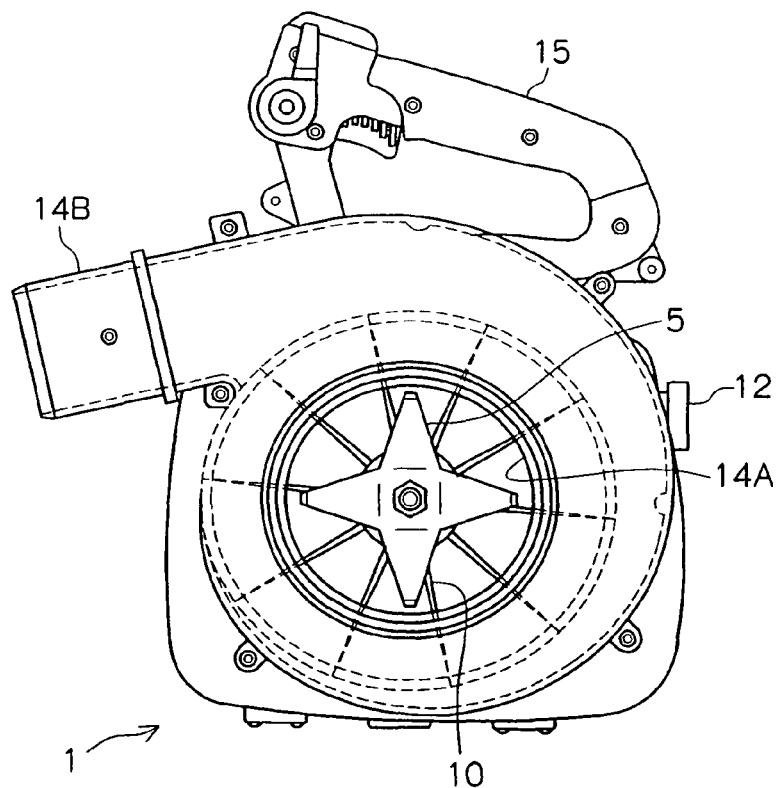

Hereinafter, the embodiments of the present invention will be described with reference to the drawings (the same reference numerals and marks are given to the same elements as the conventional case and the duplicate explanation is herein partially omitted). The hand-held suction device according to the embodiments of the present invention has a basic structure that is the same as the conventional art shown in FIG. 1 except for the cutter 5. In the hand-held suction device according to the embodiments of the present invention, an air intake opening 14A is formed in a portable-type fan case 14 along a driving axis 20 of a fan 10 and an air blowing opening 14B is formed along a centrifugal direction of the fan 10 so as to blow a sucked object sucked from a front end of a suction pipe 2 that is attached to the air intake opening 14A into the fan case 14 via the air intake opening 14A from the air blowing opening 14B via a suction passage within the fan case 14 (refer to FIG. 1).

Figure 2:
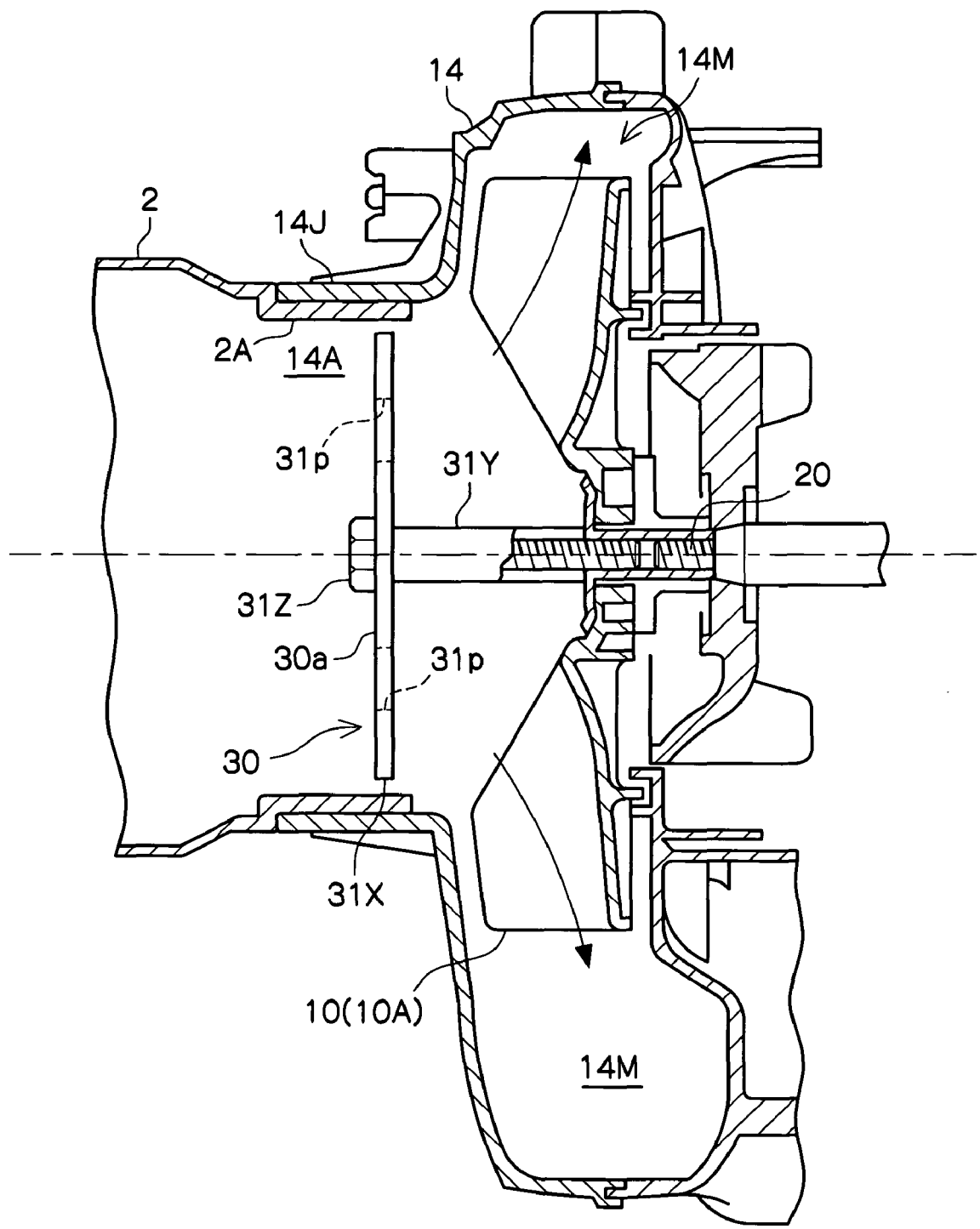
FIG. 2 is an explanatory view (a fan case cross sectional view) for explaining a hand-held powered suction device according to the embodiment of the present invention.
Figure 3A:
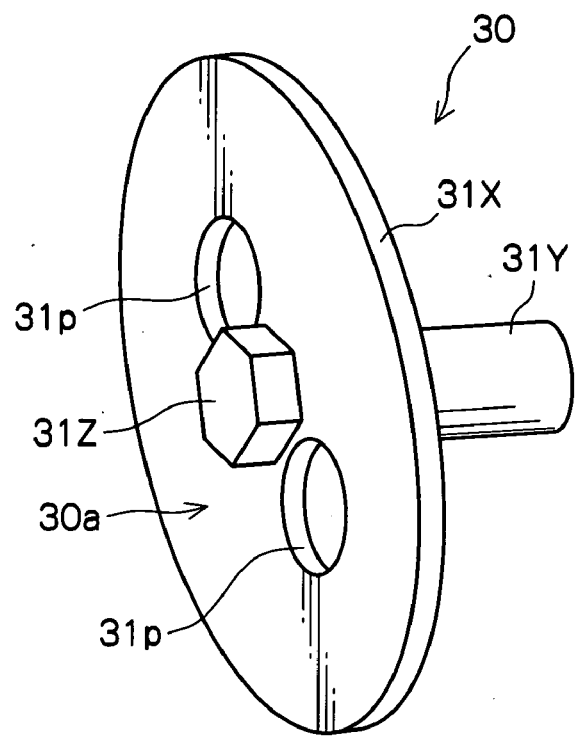
FIGS. 3A and 3B are explanatory views (a perspective view) for explaining a fan protection member according to the embodiment of the present invention, FIG. 3A being an example and FIG. 3B being a modified example.
Figure 3B:
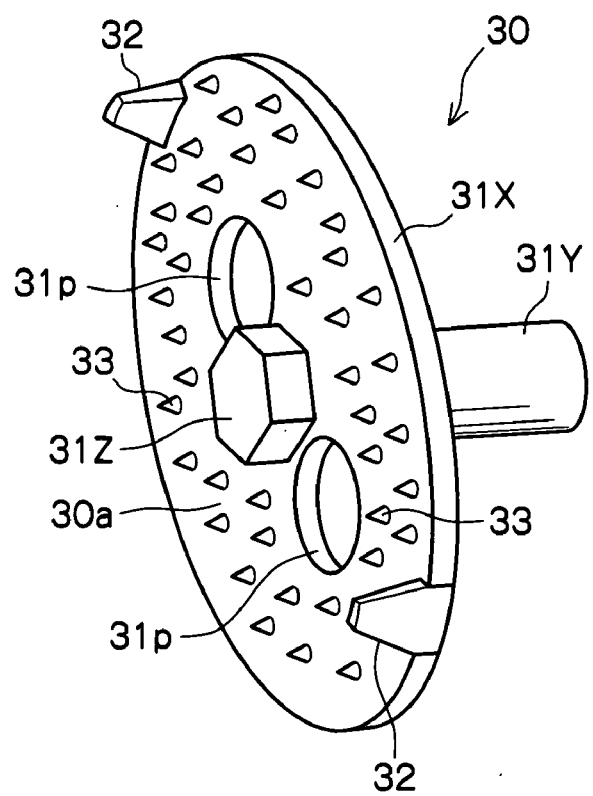

FIGS. 2, 3A and 3B are explanatory views showing an embodiment of the present invention (FIG. 2 is a partial cross sectional view of the fan case 14 around the air intake opening 14A and FIGS. 3A and 3B are perspective views of a fan protection member 30 (FIG. 3A is an example and FIG. 3B is its modified example). According to this embodiment, the fan protection member 30, which is rotated at the upstream side in an air intake direction of the fan 10 being attached so as to be integrally rotated with the driving axis 20, is provided and this fan protection member 30 has a shock absorbing surface 30a that is perpendicular in an air intake direction of the air intake opening 14A. Its cross section is generally T-shaped.

According to this construction, the sucked object sucked from the front end of the suction pipe 2 due to the rotational driving of the fan 10 by the fan protection member 30 that is provided so as to partially cover the upstream side of the fan 10 is received once, so that it is possible to prevent the sucked object from directly crushing into the blade 10A of the fan 10. The fan protection member 30 requires making it possible to have sufficient air ventilation in the air intake opening 14A while effectively covering the upstream side of the fan 10 so as not to largely reduce the suction force of the fan 10. On the other side, the fan protection member 30 is also a rotating object, so that it is desirable that the fan protection member 30 is located far from the opening on the front end side of the suction pipe 2 as much as possible and the fan protection member 30 is required to be provided within the air intake opening 14A so as to prevent damage of the fan protection member 30 due to crush into a floor and a wall when the suction pipe 2 is detached from the air intake opening 14A.

In addition, the fan protection member 30 to be rotated at the upstream side in an air intake direction of the fan 10 in accordance with the rotational driving of the fan 10 has the shock absorbing surface 30a that is perpendicular in an air intake direction of the air intake opening 14A so that if the sucked object crushes into the rotating shock absorbing surface 30a, it is possible to give an effective crushing action to the sucked object due to this shock, and thereby the sucked object that is crushed into a certain size gets across the fan protection member 30 to be lead to an air intake passage 14M belt in the fan case from between the wings 10A of the fan 10 shown by an arrow.

In this case, in order to make the crushing action of the shock absorbing surface 30a of the fan protection member 30 most effective, it is effective to provide the fan protection member 30 within the air intake opening 14A at the upstream side of the fan 10. Thereby, the sucked object sucked into the suction pipe 2 is sufficiently accelerated being given a rotating movement in accordance with a length of the suction pipe 2 to be crushed into the shock absorbing surface 30a at the substantially same rate as the rate of a peripheral rotating flow that is accelerated. Assuming that the fan protection member 30 is located in a middle portion of the suction pipe 2, even if the same suction force accelerates the sucked object, the crushing rate when the sucked object arrives at the shock absorbing surface 30a does not reach even the peripheral airflow rate and this makes it impossible to obtain a sufficient crushing action.

The structures of the air intake opening 14A of the fan case 14 and the fan protection member 30 will be described more in detail. The air intake opening 14A is formed in the inside of a suction pipe connection part 14J that is projected to the outside along the driving axis 20 in the fan case 14 and a base end part 2A of the suction pipe 2 is connected to this suction pipe connection part 14J. As shown in the drawing, the fan protection member 30 is arranged in such a manner that a shock absorbing part 31X is located in the inside of the suction pipe connection part 14J at the upstream side in an air take direction of the fan 10, and a support part 31Y is coupled with the driving axis 20 by means of a fixing device 31Z. When the shock absorbing part 31X gets too close to the fan 10, a gap between the shock absorbing part 31X and the fan 10 is made narrow and it is feared that clogging of a crushed object is generated, so that it is preferable that the shock absorbing part 31X is located within the suction pipe connection part 14J at the upstream side that is slightly separated from the fan 10.

Even in the case that the fan protection member 30 is provided, in order to obtain a desired absorbing force, it is necessary to enable to secure a sufficient air ventilation via the fan protection member 30, so that, as shown in FIG. 3A, it is necessary for the fan protection member 30 to be designed in such a manner that an opening 31p penetrating along an air intake direction in the shock absorbing part 31X having the shock absorbing surface 30a is provided or the outer shape of the shock absorbing part 31X for the air intake opening 14A having a circle opening is made into an oval figure or the like.

In the case that a plurality of openings 31p penetrates through the shock absorbing part 31X of the fan protection member 30, making the outer periphery of the shock absorbing part 31X closer to the inner wall of the air intake opening 14A, a sufficient absorbing force can be obtained while effectively blocking the absorbed object to be absorbed along the inner wall of the air intake opening 14A. In addition, in the case that the outer shape of the shock absorbing part 31X is made into the oval figure for the air intake opening 14A having the circle opening, the sufficient absorbing force can be obtained while effectively blocking the absorbed object to be absorbed along the vicinity of the center of the air intake opening 14A.

FIG. 3B shows a modified example of the fan protection member 30 shown in FIG. 3A (the same reference numerals and marks are given to the common elements and the explanation thereof is partially omitted). According to this modified example, on the outer periphery of the shock absorbing part 31X of the fan protection member 30, a crushing part 32 protruding to the upstream side in the air intake direction from the shock absorbing surface 30a is mounted and in addition, a crushing part 33 is formed on the shock absorbing surface 30a. According to the illustrated example, the both of the crushing parts 32 and 33 are provided, however, any one of them may be provided. According to the illustrated example, a pair of the crushing parts 32 is provided on the opposed position, however, more crushing parts 32 may be provided or one crushing part 32 may be provided. Further, according to the illustrated example, many crushing parts 33 are formed on the shock absorbing surface 30a, however, the crushing parts 33 may be formed sparsely or densely.

According to such an example, the crushing parts 32 and 33 are provided for the shock absorbing surface 30a to be retractably driven, so that a crushing function of the fan protection member 30 can be further enhanced due to a tearing operation or a filling operation of the crushing parts 32 and 33 protruding to the upstream side in the air intake direction. Particularly, the crushing part 32 is rotated along its outer periphery due to the rotation of the shock absorbing part 31X, so that it is possible to effectively crush the sucked object to be moved in a radiation direction by a centrifugal force crushing into the shock absorbing surface 30a.

Figure 4:
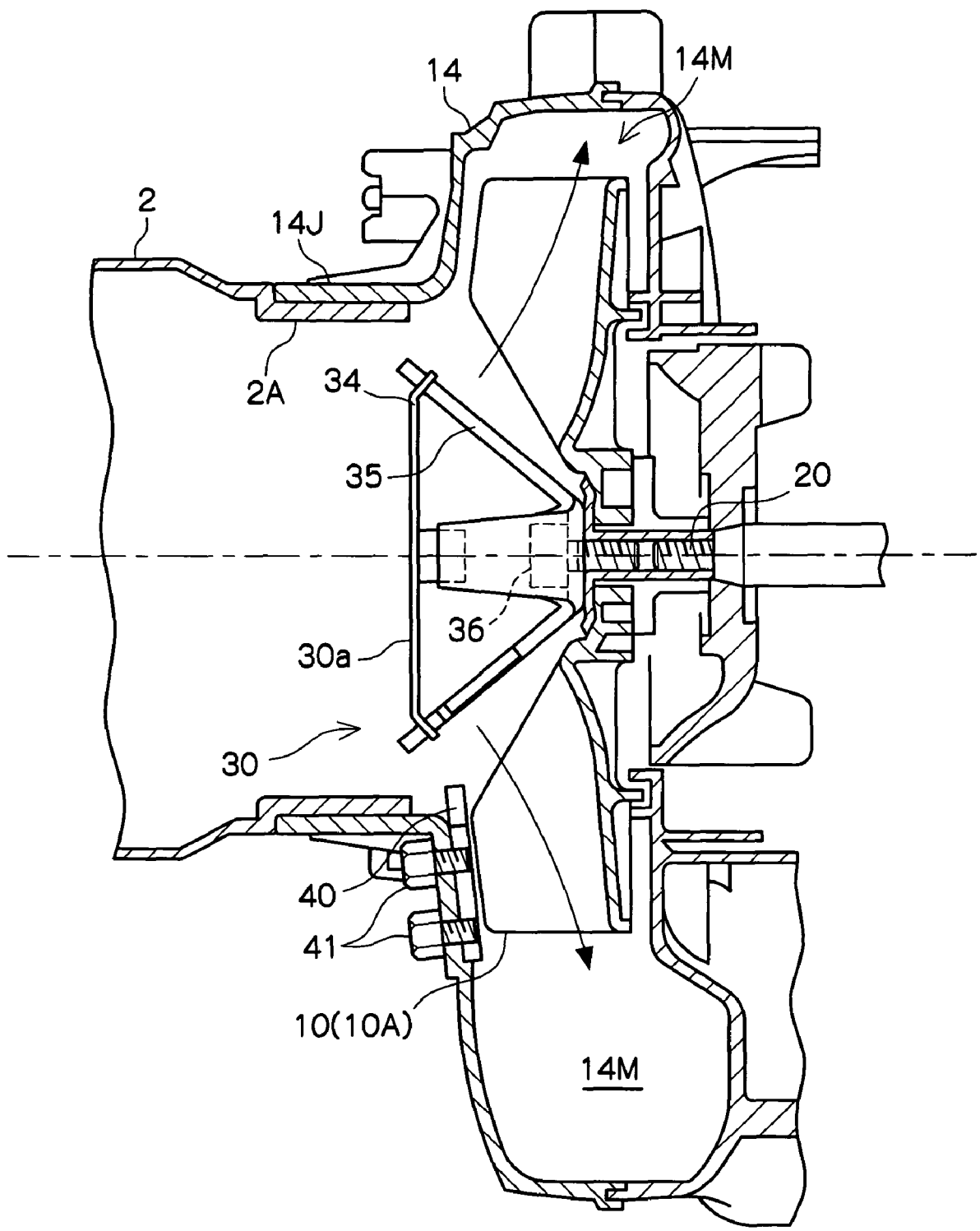
FIG. 4 is an explanatory view (a fan case cross sectional view) for explaining the hand-held powered suction device according to the embodiment of the present invention.
Figure 5A:
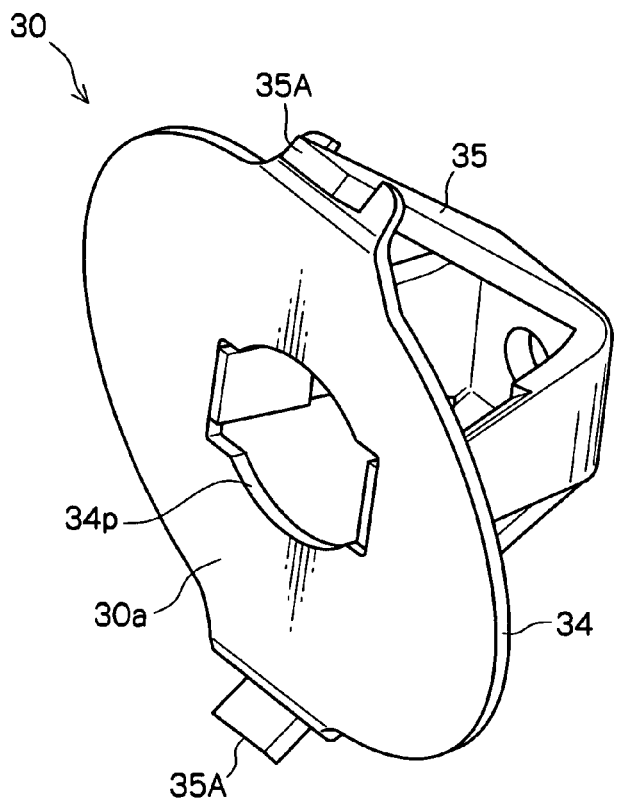
FIGS. 5A and 5B are explanatory views (a perspective view) for explaining the fan protection member according to the embodiment of the present invention, FIG. 5A being an example and FIG. 5B being a modified example.
Figure 5B:
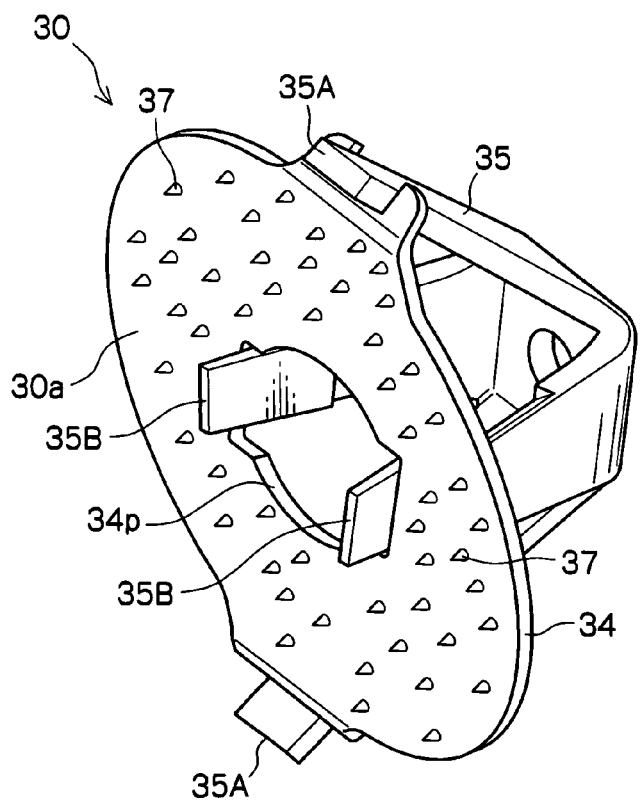

FIG. 4, FIGS. 5A and 5B are explanatory views showing other embodiments of the present invention (FIG. 4 is a partial cross sectional view of the fan case 14 in a periphery of the air intake opening 14A and FIGS. 5A and 5B are perspective views of the fan protection member 30 according to other embodiments (FIG. 5A shows an example and FIG. 5B shows its modified example). The common elements shown in FIG. 2, FIG. 3A and FIG. 3B are provided with the same reference numerals and marks and the explanation thereof is partially omitted). Also according to this embodiment, it is the same as the above-described embodiment that the fan protection member 30 is attached to the driving axis 20 within the air intake opening 14A to be rotated on the upstream side in the air intake direction of the fan 10 is provided and this fan protection member 30 has the shock absorbing surface 30a that is perpendicular in the air intake direction of the air intake opening 14A.

According to this embodiment, the fan protection member 30 is provided with a shock absorbing part 34 having the shock absorbing surface 30a and a support part 35 for supporting at least the outer peripheral part of the shock absorbing part 34 to be fixed to the driving axis 20 and the fan protection member 30 has an opening 34p on the center of the shock absorbing part 34. More specifically, the opening 34p is formed on the center part of the shock absorbing part 34 having the shock absorbing surface 30a and the support part 35 having four support legs for supporting the outer peripheral part of the shock absorbing part 34 and a peripheral edge of an opening 34p is attached to the driving axis 20 by means of a fixing device 36 together with the fan 10.

In the fan protection member 30 according to this embodiment, according to the example shown in FIG. 5A, the support leg for supporting the outer periphery of the shock absorbing part 34 in the support part 35 protrudes to the upstream side in the air intake direction from the shock absorbing surface 30a to form a crushing part 35A. Further, according to the example shown in FIG. 5B, in addition to the above-described crushing part 35A, the support leg for supporting the periphery of the opening 34p protrudes to the upstream side in the air intake direction from the shock absorbing surface 30a to form a crushing part 35B. In addition, according to the example shown in FIG. 5B, a crushing part 37 is formed on the shock absorbing surface 30a. According to the example shown in FIG. 5B, the both of the crushing parts 35A and 35B are protruded, however, any one of them may be protruded.

According to such an embodiment, as same as the above-described embodiment, it is possible to prevent the sucked object sucked from the front end of the suction pipe 2 due to the rotary driving of the fan 10 from directly crushing into the blade 10A of the fan 10 by means of the fan protection member 30 that is provided so as to partially cover the upstream side of the fan 10. In addition, the fan protection member 30 to be rotated on the upstream side in the air intake direction of the fan 10 in accordance with the rotary driving of the fan 10 has the shock absorbing surface 30a that is perpendicular in the air intake direction of the air intake opening 14A, so that, if the sucked object crushes into the rotating shock absorbing surface 30a, it is possible to give an effective crushing action to the sucked object due to this shock, and thereby, the sucked object that is crushed into a certain size gets across the fan protection member 30 to be lead to an air intake passage 14M in the fan case from among the wings 10A of the fan 10 shown by an arrow.

According to this embodiment, the opening 34p is formed around the center of the air intake opening 14A where there is no blade 10A of the fan 10, so that, even if the sucked object directly enters this opening 34p, thereby the blade 10A of the fan 10 is not damaged. The opening 34p can be opened relatively-largely by using a space where there is no blade 10A, so that, thereby, sufficient air ventilation can be secured upon driving of the fan 10 and a desired absorbing force can be obtained.

According to the example shown in FIG. 5A, the crushing part 35A can be protruded on the outer edge part of the shock absorbing part 34 with the relatively-large opening 34p formed on the center part. The crushing part 35A is rotated along the outer periphery of the shock absorbing part 34 due to the rotation thereof, so that it is possible to effectively crush the sucked object to be moved in a radiation direction by a centrifugal force crushing into the shock absorbing surface 30a.

According to the example shown in FIG. 5B, further, fan protection member 30 has the crushing part 35B to be rotated in the vicinity of the center of the air intake opening 14A and the crushing part 37 formed on the shock absorbing surface 30a, so that it is possible to further improve the crushing function for the example shown in FIG. 5A.

Further, according to the embodiment shown in FIG. 4, an entering regulation member 40 is attached to a gap between the inner wall of the fan case 14 and the top portion of the blade 10A of the fan 10. According to the example shown in the drawing, the entering regulation member 40 is attached in the inner wall of the fan case 14 by a fixing device 41 penetrating the inside of the fan case 14 from the outside of the fan case 14.

This entering regulation member 40 does not cut or crush the sucked object such as a wood chip by itself but has a function to return the sucked object into the air intake opening 14A turning the sucked object that tries to enter the above-described gap. Only by forming this entering regulation member 40 on one place around the air intake opening 14A, a sufficient function can be obtained, however, in the range that the suction performance of the fan 10 is not lowered, the entering regulation members 40 may be formed on a plurality of places around the air intake opening 14A. If the entering regulation member 40 is formed on one place around the air intake opening 14A, the sucked object such as a wood chip that tries to enter the above-described gap further tries to enter the above-described gap moving around the air intake opening 14A in accordance with rotation of the fan 10, so that this results in that the sucked object is turned into the air intake opening 14A crushing into the entering regulation members 40 during movement. When the sucked object such as a wood chip that tries to enter the above-described gap further tries to enter the above-described gap is turned into the air intake opening 14A, this sucked object tries to pass through other suction passage. Therefore, the sucked object is taken into the fan case 14 passing through the intake passage between the blades 10A of the fan 10 during repeating this and this makes it possible to avoid the phenomenon such that a wood chip or the like is sandwiched between the gaps.

Figure 6:
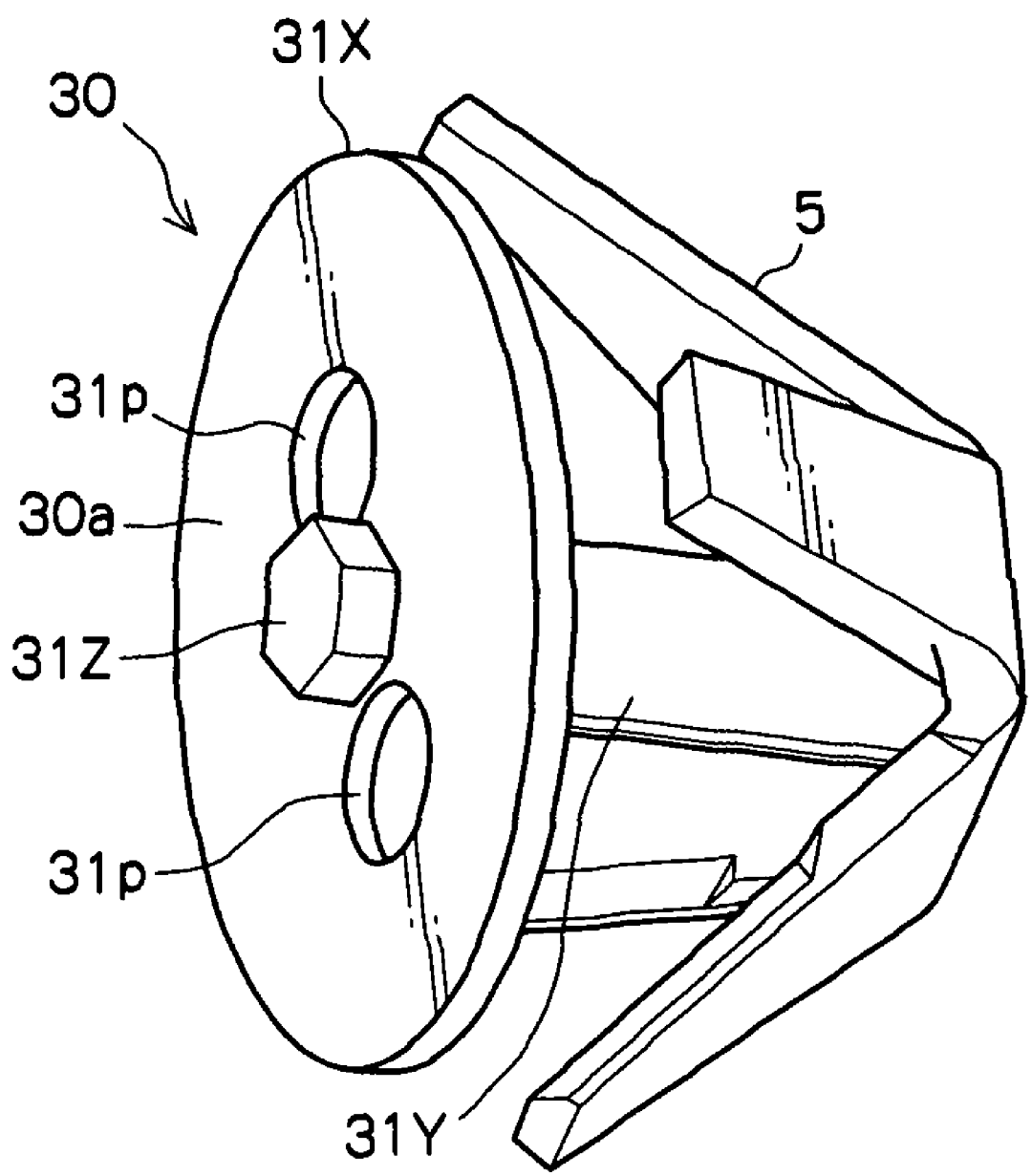
FIG. 6 is an explanatory view (a perspective view) for explaining the fan protection member according to the embodiment of the present invention.

According to the embodiment shown in FIG. 6, an example such that the fan protection member 30 is combined with the cutter 5 of the conventional art are combined is illustrated. In this example, the fan protection member 30 shown in FIG. 3A is combined with the cutter 5 and the fan protection member 30 made of the shock absorbing part 31X and the support part 31Y is fitted into the center part of the cutter 5.

According to this embodiment, the fan protection member 30 has a function to protect the blade 10A of the fan 10 and a crushing function of the sucked object due to the shock by the shock absorbing surface 30a and a further crushing function is left to the cutter 5. According to this example, the fan protection member 30 and the cutter 5 can be formed by different members, so that, in the case that one of them is damaged, the parts of the fan protection member 30a can be partially exchanged and this makes it possible to reduce a repair cost.

According to the example shown in FIG. 6, the shock absorbing part 31X is shaped in a circle or an oval and a plurality of the openings 31p is formed thereon, however, as shown in FIG. 3B, one or the both of the crushing parts 32 and 33 may be added to the shock absorbing part 31X.

The operation of the hand-held powered suction device provided with the above-described fun protection member 30 will be further explained. In the case that the operator carries the main body 1 and draws the fallen leaf on a road from the front end of the suction pipe 2 driving the fan 10, the sucked object such as a fallen leaf is carried to the air intake opening 14A passing through the inside of the suction pipe 2. However, the fan protection member 30 is located in the air intake opening 14A at the upstream side in the air intake direction of the fan 10 and this results in that most of the sucked objects carried passing through the inside of the suction pipe 2 crushes into the shock absorbing surface 30a of the fan protection member 30.

When the sucked object crushes into the shock absorbing surface 30a of the fan protection member 30, this sucked object receives a suction force by the fan 10 continuously after being turned when it crushes into the shock absorbing surface 30a, so that this sucked object crushes into the shock absorbing surface 30a repeatedly remaining at the upstream side of the fan protection member 30 and receives the crushing action due to this shock. Then, the sucked object that is effectively crushed and broken into parts due to this will be lead to the air intake passage 14M in the fan case passing through among the blades 10A of the fan 10 over the fan protection member 30.

Thus, according to the hand-held powered suction device according to the embodiments of the present invention, a disadvantage to cause a damage of the like of the fan 10 when the sucked object sucked from the front end of the suction pipe 2 directly crushes into the blade 10A of the fan 10 can be avoided and effectively crushing the sucked object due to a function of the shock absorbing surface 30a, the crushed sucked object can be sucked into the fan case 14. Thereby, there is no necessity for the hand-held powered suction device according to the embodiments of the present invention to improve the fan 10 itself, so that the fan 10 can be made light weight and increase in a weight of the device due to addition of the fan protection member 30 does not involve a problem.

In addition, the fan protection member 30 receives the sucked object on the shock absorbing surface 30a that is perpendicular in the air intake direction of the air intake opening 14A, so that, even in the case that the device sucks long leaves and long tapes, it is difficult for these sucked objects to stick to the cutter 5. Therefore, an effective crushing processing can be provided to such soft sucked object due to shock energy when this sucked object crushes into the shock receiving surface 30a. Accordingly, even in the case that the device sucks the long leaves and the long cord or the like, a disadvantage such that these sucked objects stick to the cutter and the device cannot be activated is not caused.

Having described specific preferred embodiments of the invention with reference to the accompanying drawings, it will be appreciated that the present invention is not limited to those precise embodiments, and that various changes and modifications can be effected therein by one of ordinary skill in the art without departing from the scope of the invention as defined by the appended claims.

What is claimed is:

1. A hand-held powered suction device which comprises:
 a fan case and a suction pipe having a base part at an end thereof, said fan case defining a connection part for mounting said base part of said suction pipe and a peripheral air discharge opening, said suction pipe defining an air intake passage into said fan case, said air intake passage defining a central axis,
 a fan mounted in said fan case having a drive shaft aligned with said central axis of said air intake passage, and
 a fan protection member which includes a shock-absorbing part having a shock-absorbing surface and an elongated support part, said elongated support part being connected to said drive shaft to space said shock-absorbing part from said fan and locate said shock-absorbing surface within said connection part of said fan case, said shock-absorbing part being oriented perpendicularly to said central axis, and said fan protection member including an opening aligned with said central axis for air flow therethrough.

2. The suction device according to claim 1, wherein the fan protection member has an outer shape of an oval figure for the air intake opening having a circle opening.

3. The suction device according to claim 1, wherein the fan protection member is provided with a crushing part that protrudes to the upstream side in the air intake direction from the shock absorbing surface.

4. The suction device according to claim 1, wherein the shock-absorbing part of the fan protection member includes a central opening.

5. The suction device according to claim 4, wherein the support part has a support leg for supporting the outer peripheral part of the shock absorbing part and forming a crushing part by protruding the support leg to the upstream side in the air intake direction from the shock absorbing surface.

6. The suction device according to claim 4, wherein the support part has a support leg for supporting the peripheral edge of the opening and forms a crushing part by protruding the support leg to the upstream side in the air intake direction from the shock absorbing surface.

7. The suction device according to claim 1, wherein the support part is fitted into the center part of a cutter.

8. The suction device according to claim 1, wherein the fan protection member includes crushing parts on the shock absorbing surface.

9. The suction device according to claim 1, wherein the fan protection member is generally T-shaped in cross section.

* * * * *